(No Model.)
C. A. KUNZEL, Jr.
FILTER.
No. 586,709. Patented July 20, 1897.
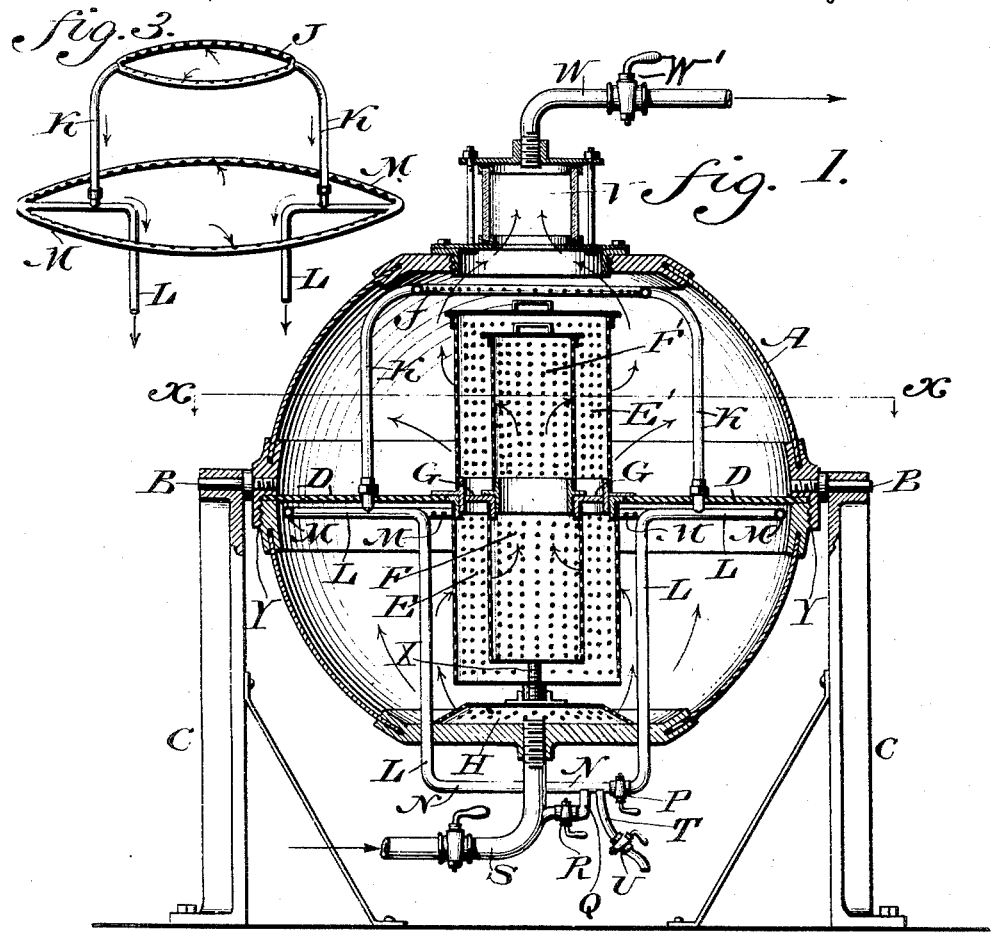
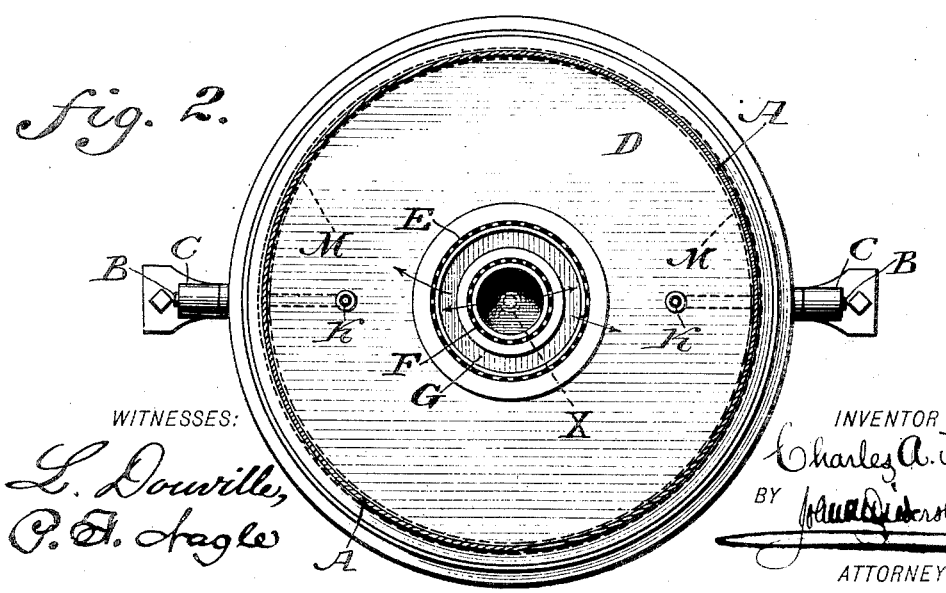
WITNESSES:
L. Douville,
O. T. Eagle
INVENTOR
Charles A. Kunzel Jr.
BY
ATTORNEY.

UNITED STATES PATENT OFFICE.

CHARLES A. KUNZEL, JR., OF HOBOKEN, NEW JERSEY, ASSIGNOR TO THE AMERICAN FILTER AND ICE PLANTS MANUFACTURING COMPANY.

FILTER.

SPECIFICATION forming part of Letters Patent No. 586,709, dated July 20, 1897.

Application filed December 10, 1895. Serial No. 571,684. (No model.)

*To all whom it may concern:*

Be it known that I, CHARLES A. KUNZEL, Jr., a citizen of the United States, residing at Hoboken, county of Hudson, State of New Jersey, have invented a new and useful Improvement in Filters, which improvement is fully set forth in the following specification and accompanying drawings.

My invention consists of a novel filter, more particularly for beer and other fluids which are liable to foam within the filter, whereby while the fluid may be nicely filtered the foam may be siphoned or withdrawn, as will be hereinafter set forth.

Figure 1 represents a vertical section of a filter embodying my invention. Fig. 2 represents a horizontal section thereof on line *x x*. Fig. 3 represents a perspective view of the foam siphon or trap of the filter.

Similar letters of reference indicate corresponding parts in the several figures.

Referring to the drawings, A designates the body or tank of a filter, which is mounted by the journals B on the stand C, said body being divided or formed in sections by the diaphragm D, which has a central opening which is occupied by the filtering chambers or cylinders E E' and F F', the cylinders F and F' being within the cylinders E and E', and both sets of cylinders having closed tops and bottoms and perforated sides. Between the cylinders, at the center thereof, is an annular partition G, which closes the space between the upper and lower cylinders E' and E, so that the fluid to be filtered cannot pass directly from the cylinder E to the upper cylinder E', but is caused to traverse the cylinders E, F, F', and E' in somewhat zigzag direction, as indicated by the arrows.

Within the body, on the base thereof, is the chamber H, which constitutes a primary filter and fluid-distributer which is somewhat of the form of a frustum of a cone, with perforations in the inclined sides, the top being closed.

J designates a perforated pipe of circular or other form which is located within the body A, near the top thereof, and is connected with the pipes K, which also support said pipe J. The pipes K are connected with the pipes L, which are secured to the bottom of the body. The pipes K pass through the bottom of the diaphragm D and are suitably attached thereto, so as to be sustained thereon.

Connected with the pipes L is a perforated pipe M, of circular form, the same occupying the upper portion of the lower section of the body A just below the diaphragm D and above the lower edges of a depending flange on the inner edge of the said diaphragm.

It will here be observed that the pipes J, K, L, and M are in communication and form a device for withdrawing the foam within the sections or divisions of the body A.

The lower ends of the pipes L are joined by the pipe N, which is provided with the cock P and has connected with it the pipe Q, which is provided with the cock R and joins the supply-pipe S of the filter. Connected also with said pipe N is an outlet-pipe T, which is provided with the cock U for discharging the foam when so required, as will be hereinafter more fully explained.

The operation is as follows: The beer or other fluid to be filtered is admitted into the body A through the pipe S, it first entering the chamber H, where it is primarily filtered, and then deflected laterally from the bottom of the cylinder E toward the side of the body and so distributed into the lower section of said body. The fluid now passes through the side of the cylinder E into the latter, and from thence through the perforated side of the lower half of the inner cylinder F into the latter. The fluid now rises in said cylinder F' and then escapes through the perforated side of the same into the cylinder E', and finally through the perforated side of the latter into the upper section of the body A, the fluid thus being filtered, in which condition it enters the chamber V, which has a glass or other transparent wall through which the condition of the fluid may be seen, said chamber V having a discharge-pipe W with the cock W' therein connected with it for evident purposes.

It will be noticed that when a foam is created the cock of the discharge-pipe W is closed. The cock R is also closed and the cocks P and U are opened, in which case the pipe T communicates with the atmosphere. The foam rises in the body or tank A and reaches the pipe M, when it escapes from said body through said pipe M and the pipes L and T. The gas in the body assists by its pressure in the removal of the foam through the pipes stated, and some or all of the gas may escape through the top pipe J and so reach the pipe U, or some of it may directly enter the pipe M and so escape into the atmosphere, if so desired. When, however, the pipes P and U are closed and the pipe R is opened, the supply and pressure having been shut off from the receiving tank or vessel A, the foam and gas may be returned to said tank or vessel and mingle with the fluid within, the foaming thus being overcome at the time.

The upper cylinder E' may be supported on the diaphragm D and the upper cylinder F' may be supported on the partition G. The lower cylinders E and F may be connected at top with flanges on said diaphragm and partition and rested below by the pin or screw X on the top of the chamber H.

The upper section of the body is screwed to the lower section thereof, as at Y, whereby the sections may be separated and access had to the interior thereof for repairs, cleansing, &c.

The body may be turned on its journals or trunnions B, so that fluid may be directed into the same in a reverse direction to that hereinbefore stated in order to loosen and remove impurities, sediment, &c., collected in the respective parts of the device.

Having thus described my invention, what I claim as new, and desire to secure by Letters Patent, is—

1. In a filter, a sectional body with a diaphragm having an opening in its center, a filtering-chamber supported on said diaphragm and communicating with the sections on both sides of said diaphragm, and discharge-pipes at the lower and upper ends of said body, a perforated ring in the upper part of the lower section, a pipe leading from said ring to the inlet-pipe, and a pipe leading from the upper section into said ring discharge-pipe, said parts being combined substantially as described.

2. A filter having a sectional body journaled on standards, a diaphragm between said sections having a central opening, and depending inner flange, filtering-chamber in said opening, a perforated pipe below said diaphragm and above the lower edge of said depending flange, and a pipe leading from said perforated pipe to said inlet-pipe, said parts being combined substantially as described.

3. A filter having a sectional body with a diaphragm between the sections thereof, a filtering-chamber in an opening in said diaphragm, a perforated pipe below said diaphragm and above the lower edge of a depending flange on said diaphragm, a gas-discharge pipe leading from said perforated pipe to the outside of the filter, and inlet and discharge pipes for said body, said parts being combined substantially as described.

4. A filter having a sectional body with a diaphragm between the sections, said diaphragm having an opening therein, perforated inner and outer cylinders or shells connected with opposite sides of said diaphragm at said opening, forming filtering-chambers, a partition at said diaphragm in said outer chamber, and a stud or pin suitably connected with the lower section and supporting the cylinders which are below said diaphragm, said parts being combined substantially as described.

5. A filter having separated sections or chambers, filtering-cylinders forming a communication between said chambers and a perforated ring near the dividing-partition of said chamber, having a pipe connection with the inlet-pipe of said filter.

CHARLES A. KUNZEL, JR.

Witnesses:
AMBROSE STOLZENBERGER,
H. PAUL SCHMIDT.